United States Patent [19]

Joyes

[11] 4,172,233
[45] Oct. 23, 1979

[54] ELECTRIC VEHICLE TRACTION MOTOR CONTROL

[75] Inventor: John F. Joyes, Solihull, England

[73] Assignee: Lucas Industries Limited, Birmingham, England

[21] Appl. No.: 884,110

[22] Filed: Mar. 7, 1978

[30] Foreign Application Priority Data

Mar. 9, 1977 [GB] United Kingdom ................. 9841/77

[51] Int. Cl.² ............................................... H02P 5/12
[52] U.S. Cl. .................................. 318/345 C; 318/139
[58] Field of Search ........... 318/139, 341, 317, 345 C, 318/505; 307/252 C, 252 M, 252 J, 240; 363/124

[56] References Cited

U.S. PATENT DOCUMENTS

| | | | |
|---|---|---|---|
| 3,993,942 | 11/1976 | Schmidt et al. | 318/341 |
| 4,032,825 | 6/1977 | Klimo | 318/341 |
| 4,074,175 | 2/1978 | Born et al. | 318/317 |
| 4,081,725 | 3/1978 | Schmidt et al. | 318/139 |

Primary Examiner—David Smith, Jr.
Attorney, Agent, or Firm—Ladas, Parry, Von Gehr, Goldsmith & Deschamps

[57] ABSTRACT

An electric vehicle traction motor control circuit includes a main thyristor in series with the motor armature. A second thyristor is connected in series with a commutating capacitor across the main thyristor which can be switched off by firing the second thyristor so that the motor current is diverted into the commutating capacitor. A third thyristor is connected in series with an inductor across the commutating capacitor and serves when fired to reverse the voltage residing on the commutating capacitor following commutating. The reversed voltage on the capacitor is detected and is used to control upper and lower current limit signals set by a driver operable control so that the capacitor is not called upon to receive a large current when it is in a low voltage condition.

6 Claims, 7 Drawing Figures

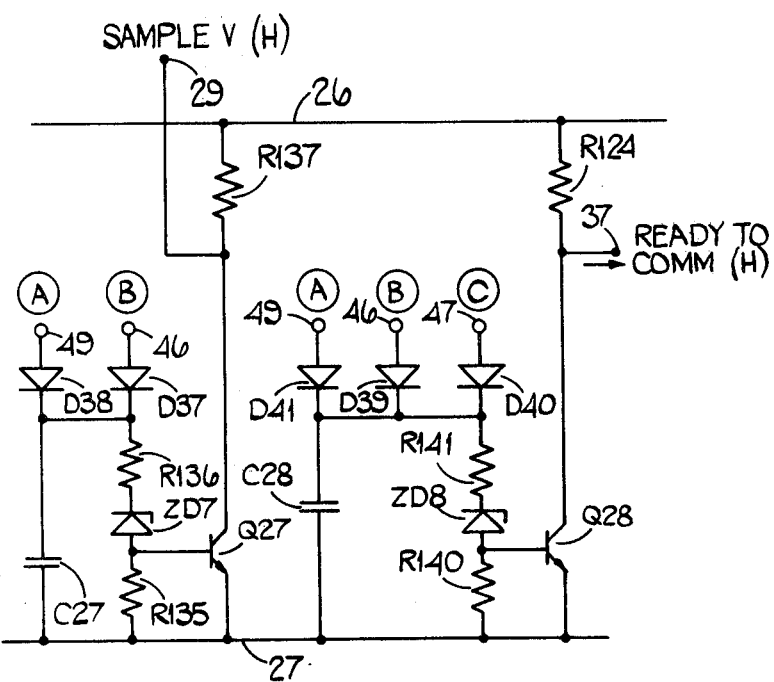

ELECTRIC VEHICLE TRACTION MOTOR CONTROL

This invention relates to an electric vehicle motor control of the general kind in which motor current is controlled by periodically making and breaking a main current path to the motor when the motor current falls below a lower limit and rises above an upper limit respectively, the limits being variable under the control of the vehicle driver.

In one known arrangement the main current path is constituted by a first thyristor connected in series with the motor between a pair of supply rails. To turn off the main thyristor it is required to divert all the motor current through a communicating path which consists of a second thyristor, first inductor and a capacitor in series across the main thyristor. A third thyristor is connected in series with a second inductor across the capacitor and is arranged when fired to reverse the voltage across the capacitor.

With such arrangements various firing orders have been proposed for the thyristors. One possibility is to fire the main thyristor and the third thyristor simultaneously when the lower limit is reached and to fire the second thyristor when the upper limit is reached. With this arrangement problems arise if the upper limit is not reached, because the reversed charge on the capacitor may leak away so that when the second thyristor is eventually fired, proper commutation does not occur. To overcome this, and other linked problems, the control circuits associated with the thyristor, have in the past been relatively complex, to provide minimum and maximum on and off times for the main thyristor.

Other approaches to this problem have also been proposed but all put unwanted constraints on the control system.

It is an object of the present invention to provide an improved control circuit in which the problems referred to are substantially avoided.

An electric vehicle traction motor control circuit in accordance with the invention comprises a main thyristor in series with the motor armature between a pair of supply rails, a second thyristor arranged on firing to divert current from the main thyristor into a commutating capacitor, a third thyristor connected in series with an inductor across the commutating capacitor and arranged on firing to reverse the voltage on the commutating capacitor, driver operable control means for determining upper and lower motor current limits, means sensitive to the magnitude of a voltage stored on the commutating capacitor for varying said motor current limits independently of said driver operable control means first firing control means for firing the main thyristor when the actual motor current is less than said lower limit, second firing control means for firing the second thyristor when the actual motor current exceeds the upper limit and third firing control means for the third thyristor.

An example of the invention is shown in the accompanying drawings in which:

FIGS. 6 and 7 are circuit diagrams of other logic circuit elements included in the control circuit.

Figure 1:
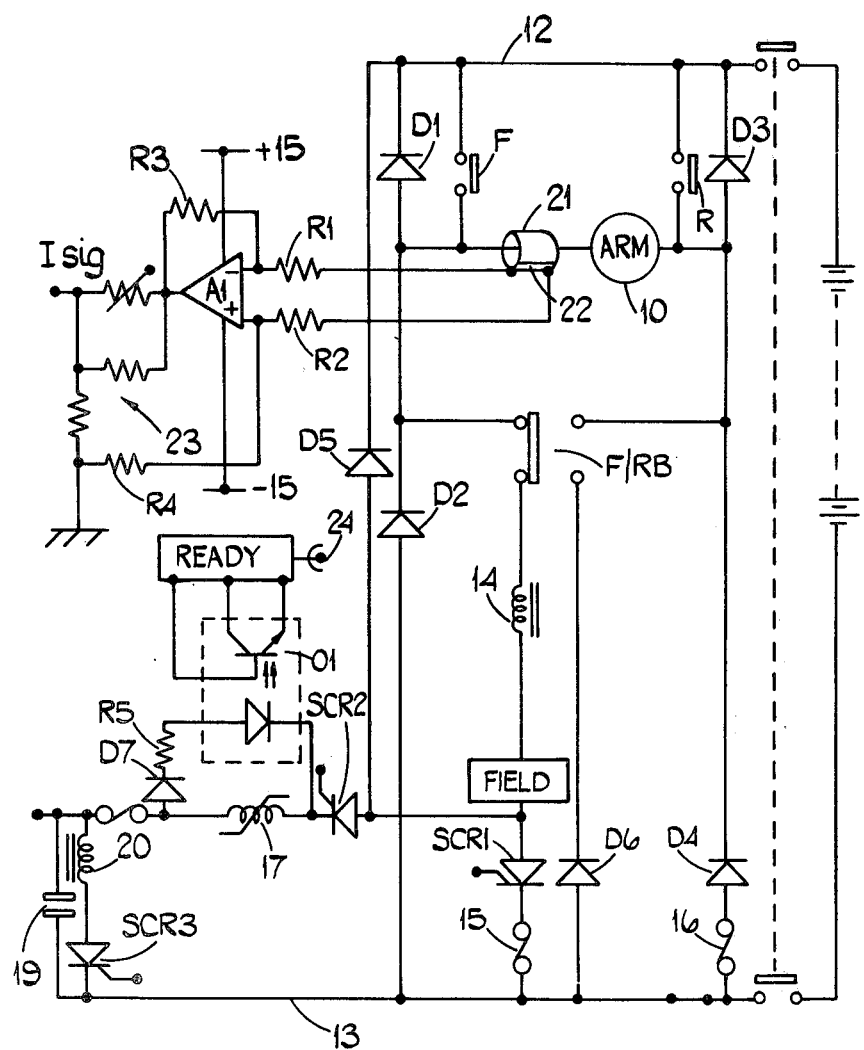
FIG. 1 is a circuit diagram of a thyristor chopper and motor circuit.

Referring firstly to FIG. 1 the motor in this case has an armature winding 10 and a field winding 11. A contact F connects one side of the armature winding 10 to a positive supply rail 12 (at about 200 V relative to a rail 13) and a contact R connects the other side of the armature 10 to the rail 12. The two sides of the armature 10 are also connected to two fixed contacts of a changeover switch F/RB, the common contact of which is connected via an inductor 14 the field winding 11, a main thyristor SCR1 and a main fuse 15 in series to the rail 13. Four diodes $D_1$ to $D_4$ connect the two sides of the armature 10 to the rails 12, 13, with the diode $D_1$ having its anode connected to the same side of the armature as the contact F and its cathode connected to the rail 12, the diode $D_2$ having its cathode connected to the anode of the diode $D_1$ and its anode connected to the rail 13, the diode $D_3$ having its anode connected to the other side of the armature 10 and its cathode connected to the rail 12 and the diode $D_4$ having its cathode connected to the anode of the diode $D_3$ and its anode connected by a brake current fuse 16 to the rail 13. A further diode $D_5$ has its anode connected to the anode of the thyristor SCR1 and its cathode connected to the rail 12. A sixth diode $D_6$ has its cathode connected to the common contact of the switch F/RB and its anode connected to the rail 13.

For commutating the current through the thyristor SCR1 there is a second thyristor SCR2 connected in series with a saturable core inductor 17, a fuse 18 and a commutating capacitor 19 between the anode of the thyristor SCR1 and the rail 13. A third thyristor SCR3 is connected in series with an inductor 20 across the capacitor 19.

For normal forward motoring the contact F is closed and the switch F/RB is closed to the right by contactors driven by circuits which do not form part of the present invention and an understanding of which is not necessary for an understanding of the present invention. When the main thyristor is conductive current flows through contact F, "forwardly" through the armature through the switch F/RB, the inductor 14, the field winding 11, the thyristor SCR1 and the main fuse 15. When the thyristor SCR2 is first (assuming that there is a negative voltage on the "upper" plate of the capacitor 19 at this stage), the current referred to is diverted from the main thyristor SCR1 into the capacitor 19 via the inductor 17. This causes the thyristor SCR1 to turn off. The diverted current causes the capacitor 19 to charge up until the voltage on the upper plate of the capacitor 19 is the same as that at the anode of the thyristor SCR1. At this stage the inductor 17 continues to cause current to flow into the capacitor 19 and the inductor 14 acts to maintain current in the armature and field windings via the "freewheel" diode $D_5$. Inductor 17 and capacitor 19 act as a resonant circuit but when the voltage on capacitor 19 reaches its peak, (i.e. when the current in the inductor 17 falls to zero) the thyristor SCR2 turns off and the charge is then held on the capacitor 19. The armature and field winding current decays away.

Firing of the thyristor SCR3 causes the inductor 20 to be connected across the charged capacitor 19. The capacitor 19 thus discharges into the inductor 20, current continuing to flow until a peak negative voltage is attained, which peak is held until the next commutation is required.

For reverse running contact F is opened, contact R is closed and switch F/RB is closed to the left. For regenerative braking when the motor is running forwardly both contacts F and R are opened and switch F/RB is closed to the left. Current induced in the armature, then flows through the switch F/RB, the inductor 14, the field winding 11, the thyristor SCR1, the fuses 15 and 16 and the diode $D_4$.

FIG. 1 also shows an armature current sensing arrangement comprising a ferromagnetic loop 21 surrounding one of the conductors leading to the armature winding 10, a Hall effect device 22 in a gap in this loop and a differential amplifier $A_1$ with its inputs connected by resistor $R_1$ and $R_2$ to the terminals of the device 22. A feedback resistor $R_3$ connects the inverting input terminal of the amplifier $A_1$ to its output terminal and a bias resistor $R_4$ connects the non-inverting terminal to earth. A resistor and thermistor network 23 is provided at the output of the amplifier $A_1$ to provide temperature compensation.

A circuit is also provided to detect the instant at which the voltage on the inductor 17 reverses and the diode $D_5$ starts to conduct during commutation. In the example shown this circuit includes a diode $D_7$, a resistor $R_5$ and the light emitting diode of an opto-coupler $O_1$ connected in series across the inductor 17. The transistor of the opto-coupler is included in a "ready" circuit (not shown in detail) which produces an output pulse at a terminal 24 for as long as there is a reversed voltage on the inductor 17. The "ready" pulse may alternatively be generated by means of a current detector on the conductor associated with the freewheel diode $D_5$. Such detector may be a current transformer or another Hall effect type detector, the latter being preferred.

Figure 2:
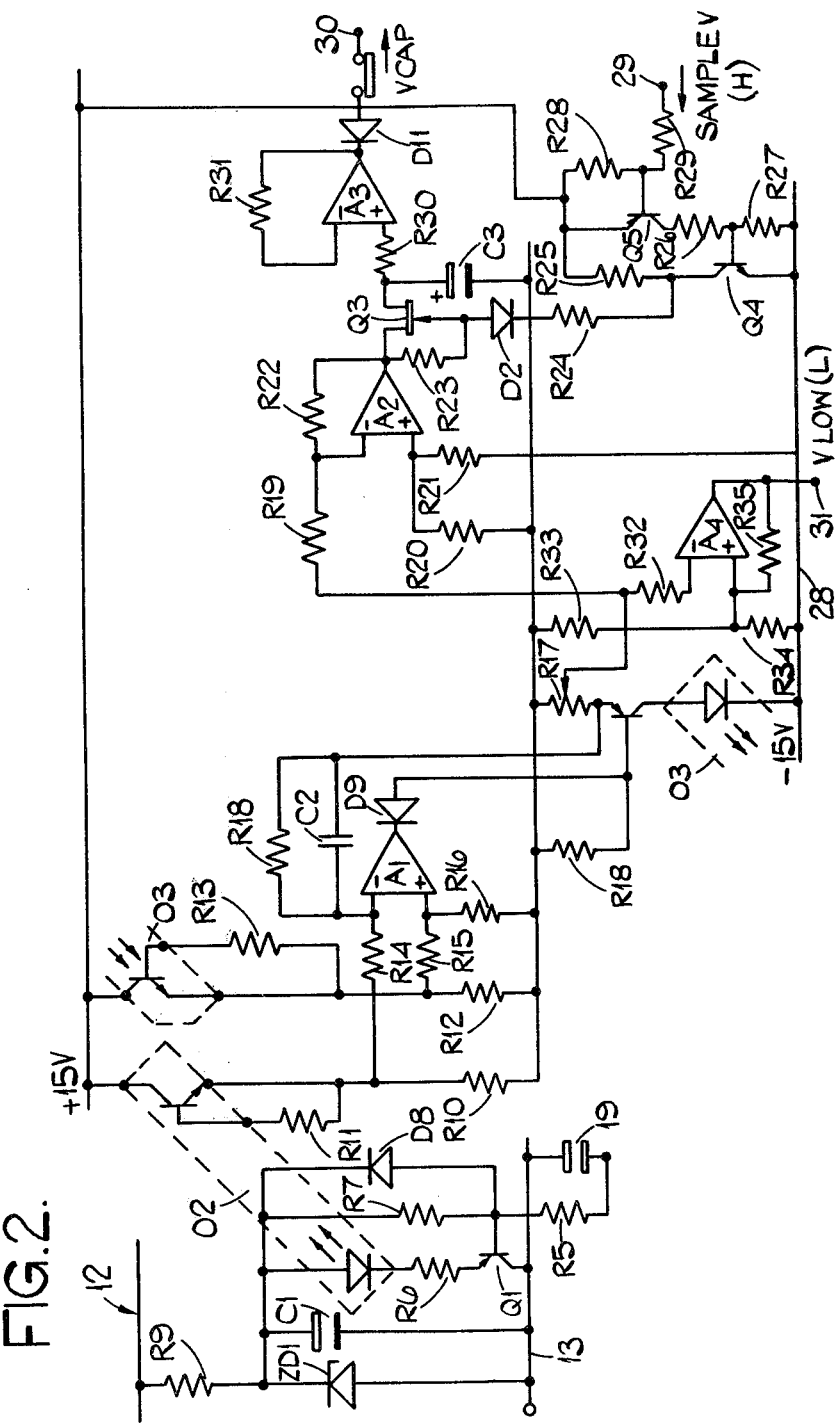
FIG. 2 is a circuit diagram of a commutating capacitor voltage sensing circuit.

Turning now to FIG. 2 there is shown a circuit which is used to monitor the voltage on the capacitor 19 after firing of the thyristor SCR3. This circuit includes a pnp transistor $Q_1$ which has its collector connected to the rail 13 and its base connected by a high ohmic value resistor $R_5$ to the capacitor 19. The emitter of the transistor $Q_1$, is connected via a current limiting resistor $R_6$ and the light emitting diode of an opto-coupler $O_2$ to a rail 25. A resistor $R_7$ is connected between the base of the transistor $Q_1$ and the rail 25 and a diode $D_8$ has its cathode connected to the rail 25 and its anode connected to the base of transistor $Q_1$ to provide protection of the transistor $Q_1$ in the period whilst the capacitor voltage is positive following commutation. The rail 25 has a zener diode regulated supply from the rail 12. To this end a resistor $R_9$ connects the rail 12 to the rail 25 and a zener diode $ZD_1$ has its cathode connected to the rail 25 and its anode connected to the rail 13, a smoothing capacitor $C_1$.

The photo-transistor of the opto-coupler $O_2$ has its collector connected to a $+15$ V supply rail 26 associated with a ground rail 27 and a $-15$ V supply rail of a power supply which is isolated from the main traction power supply rails 12, 13. The emitter of this phototransistor is connected by a resistor $R_{10}$ to the rail 27 and a resistor $R_{11}$ connects its base to its emitter. The photo-transistor of another opto-coupler $O_3$ is likewise connected with resistors $R_{12}$ and and $R_{13}$. The emitters of these two transistors are also connected by resistors $R_{14}$ and $R_{15}$ respectively to the inverting and non-inverting input terminals of an operational amplifier $A_1$.

A resistor $R_{16}$ connects the non-inverting input terminal of the amplifier $A_1$ to the rail 27 and the output terminal of the amplifier $A_1$ is connected to the cathode of a diode $D_9$ with its anode connected to the base of an pnp transistor $Q_2$ with a potentiometer $R_{17}$ connecting the emitter of the transistor $Q_2$ to the rail 27. The collector of the transistor $Q_2$ is connected via light emitting diode of the opto-coupler $O_3$ to the rail 28. A resistor $R_{18}$ connects the base of the transistor $Q_2$ to the rail 27. The emitter of the transistor $Q_2$ is connected by a resistor $R_{19}$ and a capacitor $C_2$ in parallel to the inverting input terminal of the amplifier $A_1$.

The circuit described provides a voltage across the potentiometer $R_{17}$ which is substantially linearly related to the voltage across the capacitor 19 (except when this latter voltage is positive following commutation). The use of the opto-isolator $O_3$ in the feedback loop of the amplifier $A_1$ provides compensation for the non-linearity and variations of gain with temperature of the opto-isolator $O_2$, assuming the two opto-isolators $O_2$ and $O_3$ to be reasonably matched.

The slider of the potentiometer $R_{17}$ is connected both to a sample and hold circuit based on operational amplifiers $A_2$ and $A_3$ and to a threshold voltage detector based on an operational amplifier $A_4$. The sample and hold circuit includes an n-channel field effect transistor $Q_3$ with its drain connected to the output terminal of the amplifier $A_2$ and its source connected to one side of a capacitor $C_3$ which has its other side connected to the rail 27. The inverting input terminal of the amplifier $A_2$ is connected by a resistor $R_{19}$ to the slider of the potentiometer $R_{17}$ and its non-inverting input terminal is connected by a resistor $R_{20}$ to the rail 27 and by a resistor $R_{21}$ to the rail 28. A feedback resistor $R_{22}$ connects the output terminal of the amplifier $A_2$ to the inverting input terminal thereof so that the amplifier $A_2$ acts as a linear inverting amplifier.

A bias resistor $R_{23}$ connects the output terminal of the amplifier $A_2$ to the gate of the field effect transistor $Q_3$ which is also connected to the anode of a diode $D_{10}$. The cathode of the diode $D_{10}$ is connected by a resistor $R_{24}$ to the collector of an npn transistor $Q_4$ which has its emitter connected to the rail 28 and its collector connected by a resistor $R_{25}$ to the rail 26. The base of the transistor $Q_4$ is connected to the common point of two resistors $R_{26}$, $R_{27}$ in series between the collector of a pnp transistor $Q_5$ and the rail 28. The emitter of the transistor is connected to the rail 26 and it is biased off by a resistor $R_{28}$ connected between the rail 26 and the base of the transistor $Q_4$ which is also connected by a resistor $R_{29}$ to a terminal 29 (see FIG. 7).

Whilst the terminal 29 is at a voltage close to that on the rail 26, the transistors $Q_4$ and $Q_5$ are off and the field effect transistor $Q_3$ is non-conductive. When the voltage on the terminal 29 falls as will be explained hereinafter, the transistor $Q_4$ and $Q_5$ turn on and the field effect transistor $Q_3$ assumes a low resistance state, allowing the capacitor $C_3$ to charge or discharge rapidly to the voltage then existing at the output terminal of the amplifier $A_2$.

The amplifier $A_3$ is connected as a voltage follower to provide a very high input impedance so as not to discharge the capacitor $C_3$. A resistor $R_{30}$ connects the capacitor $C_3$ to the non-inverting input terminal of the amplifier $A_3$, a resistor $R_{31}$ connecting the output terminal of the amplifier $A_3$ to its inverting input terminal. The output terminal of the amplifier $A_3$ is also connected to the cathode of a diode $D_{11}$, of which is connected by a normally closed relay contact to a terminal 30 (FIG. 3).

The amplifier $A_4$ is connected as a comparator with hysteresis. Its inverting input terminal is connected by a resistor $R_{32}$ to the slider of the potentiometer $R_{17}$, and its non-inverting input terminal is connected to the common point of a pair of resistors $R_{33}$, $R_{34}$ in series between the rails 27, 28 and also, by a resistor $R_{35}$, to its output terminal which is connected to a terminal 31.

Figure 3:
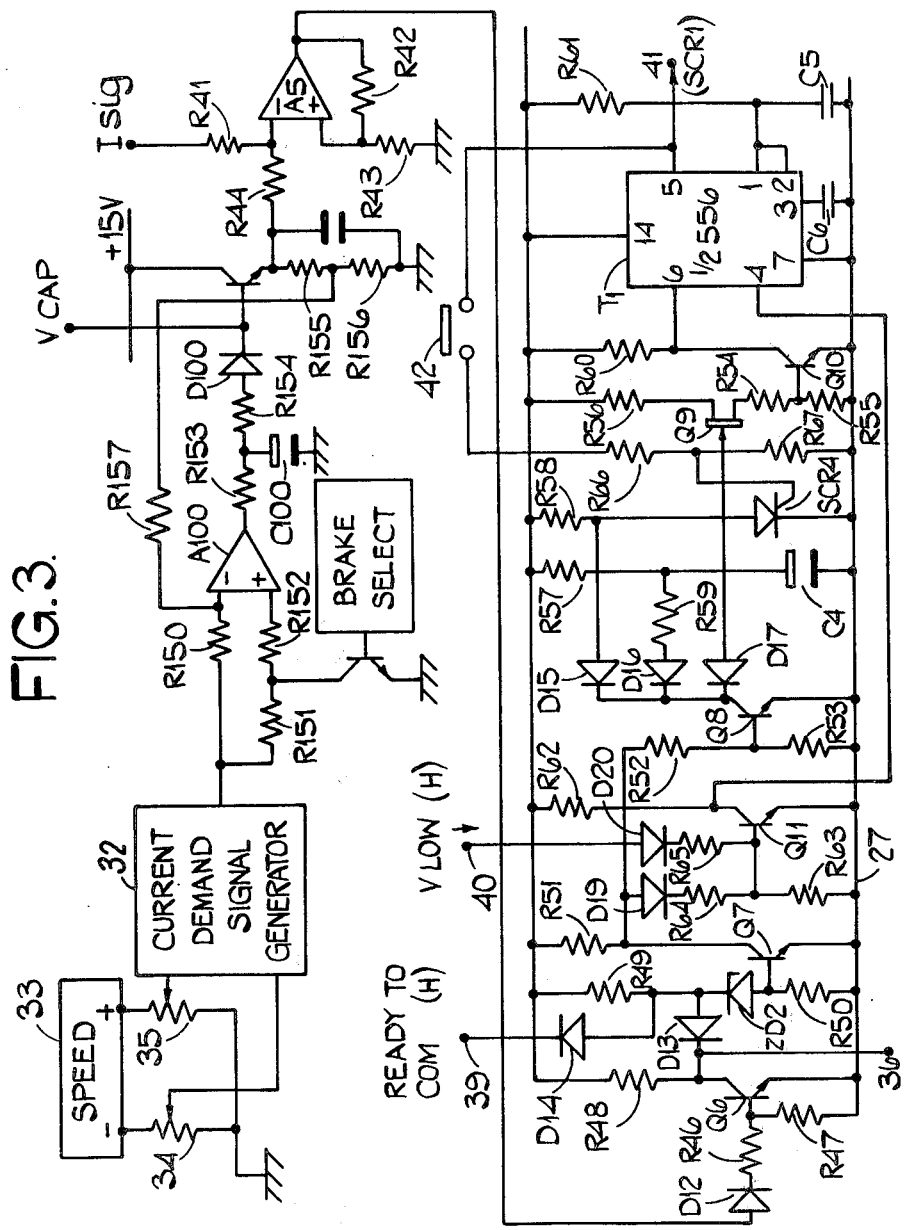
FIG. 3 is a circuit diagram of a current comparator circuit and the firing circuit for one of the thyristors of the chopper circuit of FIG. 1.

Turning now to FIG. 3, there is shown schematically the arrangement in which the signals from the current transducer circuit of FIG. 1 and the capacitor voltage circuit of FIG. 2 are used. The current signal is applied via a resistor $R_{41}$ to the inverting input terminal of an operational amplifier $A_5$ connected as a comparator with hysteresis. The required hysteresis is obtained by means of resistors $R_{42}$, $R_{43}$ connected in series between the output terminal of the amplifier $A_5$ and the rail 27 with their common point connected to the non-inverting input terminal of the amplifier $A_5$. The inverting input terminal of the amplifier $A_5$ is connected by a resistor $R_{44}$ to a motor current demand signal generating circuit 32, of which the output stage is shown. It receives input signals from a speed transducer circuit 33 and from accelerator and brake pedal operated potentiometers 34 and 35 and produces a d.c. output signal representative of the desired average motor current varying in accordance with a complex function of speed and pedal depression. Details of a similar circuit arrangement may be found in prior U.K. Patent Application No. 8364/75.

The output stage is constituted by an operational amplifier $A_{100}$ which operates either in inverting or non-inverting mode according to whether a transistor $Q_{100}$ is on or not. The inverting input terminal of the amplifier $A_{100}$ is connected by a resistor $R_{150}$ to a point in the circuit 32 and two resistors $R_{151}$, $R_{152}$ of the same value connect the same point to the non-inverting input terminal. A resistor $R_{153}$ combined with a capacitor $C_{100}$ in series connect the output terminal of the amplifier $A_{100}$ to the earth rail 27. A resistor $R_{154}$ connects the junction of the resistor $R_{153}$ with the capacitor $C_{100}$ to the anode of a diode $D_{100}$, the cathode of which is connected to the base of a transistor $Q_{101}$ connected as an emitter follower. Two resistors $R_{155}$, $R_{156}$ in series connect the emitter of the transistor $Q_{101}$ to the rail 27 with the junction of these resistors connected to the inverting input terminal of the amplifier $A_{100}$ by a feedback resistor $R_{157}$. The emitter of the transistor $Q_{101}$ is connected by the resistor $R_{44}$ to the inverting input terminal of the amplifier $A_5$.

The terminal 30 is connected to the base of the emitter follower transistor $Q_{101}$. If the output of the amplifier $A_5$ is high the voltage at its non-inverting input terminal is at a fixed positive level which must be exceeded by the voltage at its inverting input terminal before the amplifier output can go negative. Similarly when the output of the amplifier $A_5$ is low, there is a fixed negative voltage applied to the non-inverting input terminal of the amplifier $A_5$. The signals applied via resistors $R_{41}$ and $R_{44}$ are of opposite polarity and these resistors may be regarded as forming a potential divider so that for a given demand signal the output of the amplifier $A_5$ will go low when an upper current limit is exceeded and will go high when the motor current is less than a low current limit, both limits being variable by the driver using the pedals 34, 35.

The effect of the capacitor voltage signal applied via terminal 30 is to decrease the level to which the current demand signal may rise if capacitor voltage is too low.

The output terminal of the amplifier $A_5$ is connected by a diode $D_{12}$ and a resistive potential divider $R_{46}$, $R_{47}$ to the base of an npn transistor $Q_6$ with its emitter grounded to the rail 27 and its collector connected by a resistor $R_{48}$ to the rail 26. The collector of the transistor $Q_6$ is connected to a terminal 36 (FIG. 4) and also to the cathode of a diode $D_{13}$ with its anode connected by a resistor $R_{49}$ to the rail 26. A diode $D_{14}$ connects the anode of the diode $D_{13}$ to a terminal 37 (FIG. 7). A zener diode $ZD_2$ has its cathode connected to the anode of the diodes $D_{13}$ and $D_{14}$ and its anode connected by a resistor $R_{50}$ to the rail 27. The resistor $R_{49}$ and the zener diode $ZD_2$ are chosen so that the zener diode $ZD_2$ does not conduct if either of the diodes $D_{13}$, $D_{14}$ is conducted, i.e. if the transistor $Q_6$ is on or the terminal 39 voltage is low.

An npn transistor $Q_7$ has its emitter connected to the rail 27 and its base connected to the anode of the zener diode $ZD_2$, its collector being connected by a resistor $R_{51}$ to the rail 26. The transistor $Q_7$ turns on whenever the zener diode $ZD_2$ is conducting.

The emitter of the transistor $Q_7$ is connected by a resistive potential divider $R_{52}$, $R_{53}$ to the base of an npn transistor $Q_8$ which controls an oscillator based on a unijunction transistor $Q_9$ and a capacitor $C_4$. The secondary base of the unijunction transistor $Q_9$ is connected by two resistors $R_{54}$, $R_{55}$ in series to the rail 27 and its primary base is connected by a resistor $R_{56}$ to the rail 26. There are two separate charging paths for the capacitor $C_4$ which determine the frequency of the oscillator. One such path is constituted by a resistor $R_{57}$ connected in series with the capacitor $C_4$ between the rails 26, 27. The other path is constituted by a resistor $R_{58}$, a diode $D_{15}$, a diode $D_{16}$ and a resistor $R_{59}$ in series across the resistor $R_{57}$, the total resistance of the resistors $R_{58}$, $R_{59}$ being significantly less than the resistance of the resistor $R_{57}$. A diode $D_{17}$ is connected across the series combination of the resistor $R_{59}$ and the diode $D_{16}$, with its polarity reversed relative to that of the diode $D_{16}$. The anode of the diode $D_{16}$ and the cathode of the diode $D_{17}$ are connected to the collector of the transistor $Q_8$. The anode of the diode $D_{15}$ is connected to the anode of a diode $D_{18}$, the cathode of which is connected to the anode of a thyristor SCR4 which has its cathode connected to the rail 27.

When the transistor $Q_8$ is conducting, the oscillator does not operate since the capacitor $C_4$ is held discharged. When the transistor $Q_8$ is turned off, i.e. when the transistor $Q_7$ turns on, the oscillator starts to run at a relatively high frequency until the thyristor SCR4 is fired as will be explained hereinafter. Thereafter, for as long as the transistor $Q_8$ is off, the oscillator will operate at a low frequency determined by the resistor $R_{57}$.

The common point of the resistors $R_{54}$, $R_{55}$ is connected to the base of a transistor $Q_{10}$ which has its emitter connected to the rail 27 and its collector connected by a resistor $R_{60}$ to the rail 26. The collector of the transistor $Q_{10}$ is connected to the TRIGGER terminal of an integrated circuit timer $T_1$ (shown as one half of a dual timer circuit type NE556 manufactured by signetics). The DISCHARGE and THRESHOLD terminals of this timer circuit are connected to the junction of a resistor $R_{61}$ and a capacitor $C_5$ in series between the rails 26 and 27. The CONTROL VOLTAGE terminal of the circuit is connected to the rail 27 by a capacitor $C_6$ and the RESET terminal is connected to the collector of an npn transistor $Q_{11}$ which has its emitter connected to the rail 27 and its collector connected by a resistor $R_{62}$ to the rail 26. The base of the transistor $Q_{11}$ is connected by a resistor $R_{63}$ to the rail 27 and by a resistor $R_{64}$ to the cathode of a diode $D_{19}$ having its anode connected to the collector of the transistor $Q_7$. The base of the transistor $Q_{11}$ is also connected by a resistor $R_{65}$ to the cathode of a diode $D_{20}$, the anode of which is connected to a terminal 40.

The OUTPUT terminal of the timer circuit $T_1$ is connected to a terminal 41 and thence to the gate of the main thyristor SCR1. This OUTPUT terminal is also connected by a normally closed override contact 42 and a resistor $R_{66}$ to gate of the thyristor SCR4, this gate being also connected by a resistor $R_{67}$ to the rail.

Assuming the voltage at terminal 40 is low and that at terminal 89 is high turning off of the transistor $Q_6$ by a negative transition in the output of the output of the current comparator operational amplifier $A_5$ causes transistor $Q_7$ to turn on which in turn causes the oscillator to commence oscillating at relatively high frequency, and, because, in these circumstances, the transistor $Q_{11}$ is turned off, the timer $T_1$ will be triggered the resistors $R_{58}$ and $R_{59}$ and the capacitor $C_4$ fixing the delay before such triggering at approximately 70 $\mu$S. The timer OUTPUT terminal now goes high for 20 $\mu$S, set by the resistor $R_{61}$ and the capacitor $C_5$. This output pulse fires the thyristors SCR1 and SCR4, the latter interrupting the previous charging path for the capacitor $C_4$. The resistor $R_{57}$ and the capacitor $C_4$ set the repetition frequency of the oscillator at approximately 200 Hz so that additional firing pulses are produced by the timer $T_1$ at this frequency, in case the current level in the thyristor SCR1 is insufficient for it to hold the thyristor SCR1 conductive when the output of the current comparator operational amplifier $A_5$ goes high (indicating that the actual current has reached the upper limit), transistor $Q_6$ turns on, turning off transistor $Q_7$ which turns on transistors $Q_8$ and $Q_{11}$. Transistor $Q_{11}$ holds the RESET terminal of the timer $T_1$ low so that it cannot be triggered and transistor $Q_8$ maintains the capacitor $C_4$ discharged so that the oscillator ceases to run.

Figure 4:
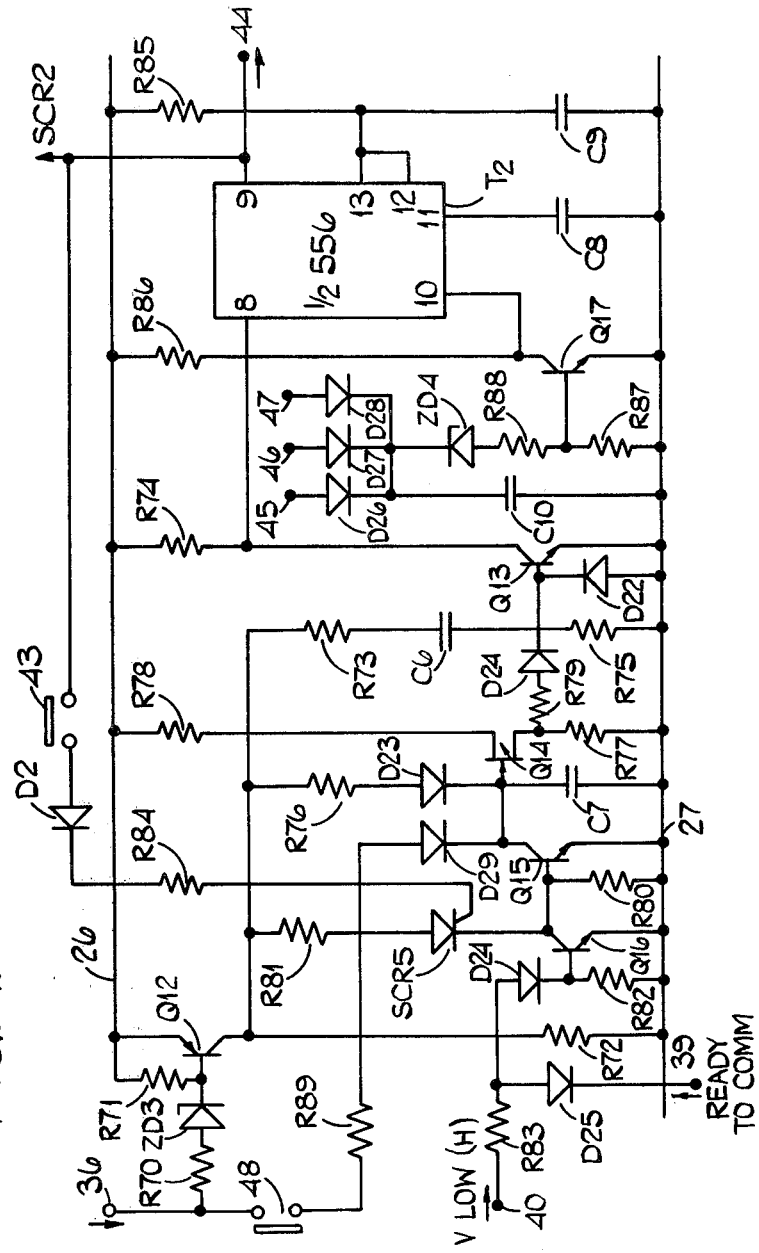
FIGS. 4 and 5 are circuit diagrams of firing circuits for the two other thyristors of FIG. 1 respectively.

The terminals 36, 39 and 40 provide input signals to the circuit of FIG. 4 which controls firing of the thyristor SCR2. A resistor $R_{70}$ connects the terminal 36 to the anode of a zener diode ZD3, the cathode of which is connected by a resistor $R_{71}$ to the rails 26 so that the zener diode ZD3 only conducts when the transistor $Q_6$ of FIG. 3 is on (i.e. when the current comparator operation amplifier $A_5$ output is high). The cathode of the zener diode ZD3 is connected to the base of a pnp transistor $Q_{12}$, the emitter of which is connected to the rail 26 and the collector of which is connected to the rail 27 by a resistor $R_{72}$. The collector of the transistor $Q_{12}$ is connected by a resistor $R_{73}$ and a capacitor $C_6$ in series to the base of a npn transistor $Q_{13}$ which has its emitter connected to the rail 27 and its collector connected by a resistor $R_{74}$ to the rail 26. The base of the transistor $Q_{13}$ is connected to the cathode of a protective diode $D_{22}$ which has its anode grounded to rail 27 and is also connected by a resistor $R_{75}$ to the rail 27 to bias the transistor $Q_{13}$ off.

It will be appreciated that when the transistor $Q_{12}$ turns on the transistor $Q_{13}$ will be turned on for as long as it takes the capacitor to charge up (the time constant $R_{73} C_6$ being approximately 10 $\mu$S).

The collector of the transistor $Q_{12}$ is also connected by a resistor $R_{76}$ and a diode $D_{23}$ in series to one side of a capacitor $C_7$, the other side of which is connected to the rail 27. Said one side of said capacitor $C_7$ is connected to the emitter of a unijunction transistor $Q_{14}$, which has its secondary base connected by a resistor $R_{77}$ to the rail 27 and its primary base connected to the rail 26 by a resistor $R_{78}$. The secondary base of the unijunction transistor $Q_{14}$ is also connected by a resistor $R_{79}$ and a diode $D_{24}$ in series to the base of the transistor $Q_{13}$.

The resistor $R_{76}$, capacitor $C_7$ and unijunction transistor $Q_{14}$ form an oscillator, operating under the control of the transistor $Q_{12}$ at a frequency of about 3 KHz. This oscillator is arranged to be inhibited by an npn transistor $Q_{15}$ with its collector emitter connected across the capacitor $C_7$ and biased off by a resistor $R_{80}$ connected between its base and the rail 27. The base of the transistor $Q_{15}$ is also connected to the cathode of a thyristor SCR5 the anode of which is connected by a resistor $R_{81}$ to the collector of the transistor $Q_{12}$. The base of the transistor $Q_{15}$ is further connected to the collector of an npn transistor $Q_{16}$ having its emitter connected to the rail 27 and its base connected by a resistor $R_{82}$ to the rail 27. A diode $D_{24}$ has its cathode connected to the base of the transistor $Q_{16}$ and its anode connected by a resistor $R_{83}$ to the terminal 40. A diode $D_{25}$ connects the anode of the diode $D_{24}$ to the terminal 39 so that the transistor $Q_{16}$ can only turn on when the signals at both terminals 39 and 40 are high.

The thyristor SCR5 has its gate connected by a resistor $R_{84}$, a diode $D_{26}$ and a normal closed override contact 43 to the OUTPUT terminal to another integrated circuit timer $T_2$ (constituted by the other half of the NE556 circuit of time $T_1$). The INPUT terminal of the timer $T_2$ is connected to the emitter of the transistor $Q_{13}$ and its CONTROL VOLTAGE terminal is connected by a capacitor $C_8$ to the rail 27. The THRESHOLD and DISCHARGE terminals of the timer $T_2$ are both connected by a resistor $R_{85}$ to the rail 26 and by a capacitor $C_9$ to the rail 27, the resistor $R_{85}$ and the capacitor $C_9$ setting the on-time of the monostable multivibrator constituted by the timer $T_2$ and its associated components at about 20 $\mu$S. The OUTPUT terminal of the timer $T_2$ is also connected to the gate of the second thyristor SCR2 (FIG. 1) and to a terminal 44.

The RESET terminal of the timer $T_2$ is connected by a resistor $R_{86}$ to the rail 26 and by the collector-emitter path of an npn transistor $Q_{17}$ to the rail 27. The base of the transistor $Q_{17}$ is connected by a resistor $R_{87}$ to the rail 27 and by a resistor $R_{88}$ to the anode of a zener diode ZD4 having its cathode connected to the cathode of three diodes $D_{26}$, $D_{27}$, and $D_{28}$ respectively. The anodes of the diodes $D_{26}$, $D_{27}$, and $D_{28}$ are connected to three terminals 45, 46 and 46 see FIG. 5 respectively, so that a high voltage signal at any of these terminals will turn on the transistor $Q_{17}$ and reset the timer $T_2$. A capacitor $C_{10}$ is connected between the cathode of the zener diode ZD4 and the rail 27.

Provided that the signal voltages at the terminals 45, 46 and 47 are all low when the transistor $Q_{12}$ is turned on by output of the current comparator operational amplifier $A_5$ going low, the timer $T_2$ will be triggered immediately and the oscillator around the unijunction transistor $Q_{14}$ starts to run providing further triggering pulses to the timer $T_2$. The first output pulse from the timer $T_2$ turns on the thyristor SCR5 which, unless the transistor $Q_{16}$ is on, turns on the transistor $Q_{15}$ on, thereby holding the capacitor $C_7$ discharged and stopping the oscillator from running.

A normally open contact 48 connects the terminal 36 via a resistor $R_{89}$ and a diode $D_{29}$ to the emitter of the unijunction transistor $Q_{14}$, so that when the contact 48 is closed (when a "creep" condition has been selected) the oscillator runs at a significantly lower frequency of say 400 Hz when the output of the current comparator operational amplifier $A_5$ is low. In this condition the transistor $Q_{12}$ is off so that firing of the thyristor $SCR_5$ does not provide current to turn on the transistor $Q_{15}$ and stop the oscillator.

Figure 5:
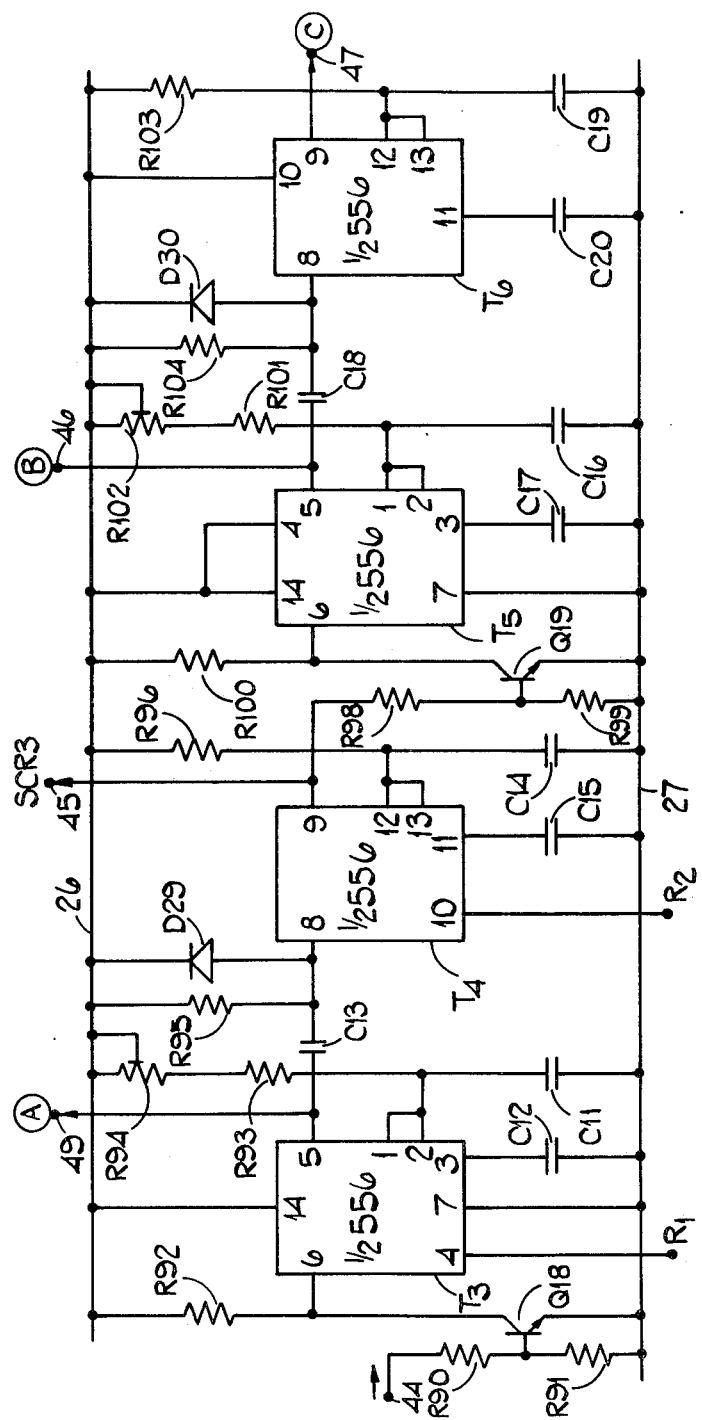
Figure 6:
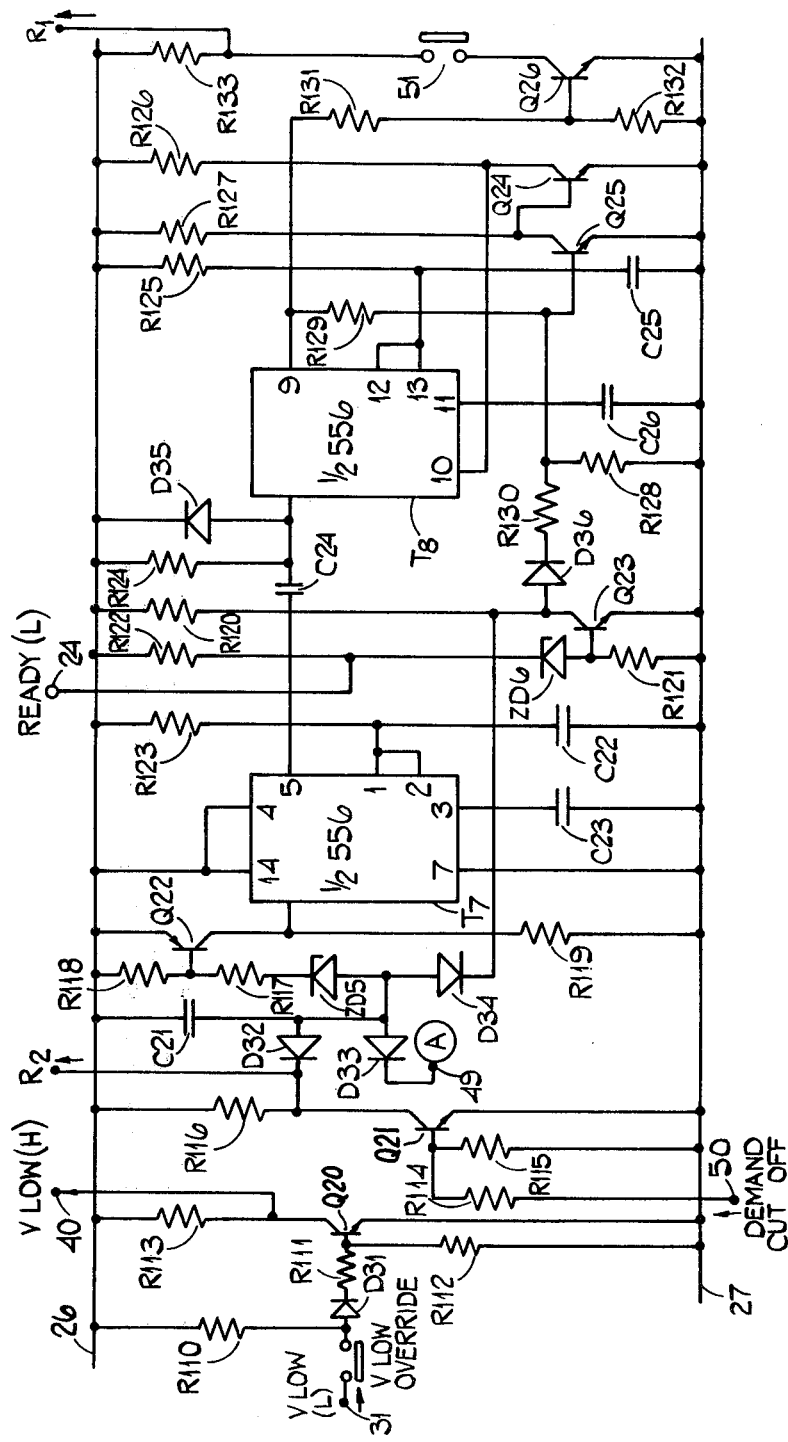

Turning now to FIG. 5 the OUTPUT terminal of the timer $T_2$ (FIG. 4) is connected via the terminal 44 to through two resistors $R_{90}$, $R_{91}$ in series to the rail 27. The common point of these resistors is connected to the base of an npn transistor $Q_{18}$, the emitter of which is grounded to the rail 27. The collector of the transistor $Q_{18}$ is connected by a resistor $R_{92}$ to the rail 26 and is also connected to the TRIGGER terminal of another timer integrated circuit $T_3$ which is connected as a monostable multivibrator with a pulse duration of about 2.5 mS. The THRESHOLD and DISCHARGE terminals of the timer $T_3$ are the rail 27 by a capacitor $C_{11}$ and to the rail 26 by a resistor $R_{93}$ and variable reset $R_{94}$ in series. A capacitor $C_{12}$ connects the CONTROL VOLTAGE terminal of the timer $T_3$ to the rail 26 and the RESET terminal is connected to a terminal $R_1$. The OUTPUT terminal is connected to a terminal 49 (FIGS. 6 and 7).

The output terminal of the timer $T_3$ is also connected via a capacitor $C_{13}$ to one end of a resistor $R_{95}$ the other end of which is connected to the rail 26. A diode $D_{29}$ has its cathode connected to the rail 26 and its anode connected to the junction between the capacitor $C_{13}$ and the resistor $R_{95}$ so that a negative going pulse is produced at this junction when the timer $T_3$ resets. This junction is also connected to the TRIGGER terminal of another timer $T_4$, again connected as a monostable multivibrator with a pulse duration of about 20 $\mu$S. The THRESHOLD and DISCHARGE terminals of the timer $T_4$ are connected to the rail 26 by a resistor $R_{96}$ and to the rail 26 by a capacitor $C_{14}$. A capacitor $C_{15}$ connects the CONTROL VOLTAGE terminal of the timer $T_4$ to the rail 27 and its RESET terminal is connected to a terminal $R_2$. The output terminal of the timer $T_4$ is connected via the terminal 45 to the gate of the thyristor $SCR_3$ and also to the reset circuit of the timer $T_2$ (FIG. 4).

The OUTPUT terminal of the timer $T_4$ is also connected by two resistors $R_{98}$, $R_{99}$ in series to the rail 27, the junction of these resistors being connected to the base of an npn transistor $Q_{19}$ which has its emitter connected to the rail 27. The collector of the transistor $Q_{19}$ is connected by a load resistor $R_{100}$ to the rail 26 and is also connected to the TRIGGER terminal of yet another timer $T_5$ connected as a monostable multivibrator with a pulse duration of 300 $\mu$S. The THRESHOLD and DISCHARGE terminals of the timer $T_5$ are connected to the rail 27 by a capacitor $C_{16}$ and to the rail 26 by a resistor $R_{101}$ and a variable resistor $R_{102}$ in series. The CONTROL VOLTAGE terminal of the timer $T_5$ is connected by a capacitor $C_{17}$ to the rail 27 and its RESET terminal is connected directly to the rail 26.

A capacitor $C_{18}$ connects the OUTPUT terminal of the timer $T_5$, which terminal is also connected to the terminal 46, to the TRIGGER terminal of a further timer circuit $T_6$ connected as a monostable multivibrator with a pulse length of 100 $\mu$S. The THRESHOLD and DISCHARGE terminals of the timer $T_6$ are connected to the rail 27 by a capacitor $C_{19}$ and to the rail 26 by a resistor $R_{103}$. The CONTROL VOLTAGE terminal of the timer $T_6$ is connected by a capacitor $C_{20}$ to the rail 26 and its RESET terminal is connected directly to the rail 26. The TRIGGER terminal is connected by a resistor $R_{104}$ and a diode $D_{30}$ to the rail 27 so as to convert the trailing edge of the output pulse of the timer $T_5$ into a negative-going triggering inpulse for the timer $T_6$. The output terminal of the timer $T_6$ is connected to the terminal 47.

Turning now to FIG. 6, there is shown a simple circuit which converts the low signal which exists at terminal 31 when the capacitor 19 voltage is too low into a high level signal for use in the circuits of FIGS. 3 and 4. This circuit includes a resistor $R_{110}$ connecting the anode of a diode $D_{31}$ to the rail 26. The terminal 31 is connected to the anode of this diode by a normally closed contact which is energised if it is required to override the Vlow control signal. The cathode of the diode $D_{31}$ is connected by a resistor $R_{111}$ to the base of an npn transistor $Q_{20}$ which base is also connected by a resistor $R_{111}$ to the rail 27. The transistor $Q_{20}$ has its emitter connected to the rail 27 and its collector connected to the terminal 40 and by a resistor $R_{113}$ to the rail 26.

The $R_2$ reset signal for resetting the timer $T_4$ is generated by inverting a demand cutoff signal generated under certain circumstances during change overs between forward and reverse motoring and braking. This particular feature is not essential to the present invention and the derivation of the demand cutoff signal will not be described herein. The demand cutoff terminal 50 is connected by a resistor $R_{114}$ to the base of an npn transistor $Q_{21}$ which has its emitter connected to the rail 27. A resistor $R_{115}$ connects the base of the transistor $Q_{21}$ to the rail 27 and a resistor $R_{116}$ connects the collector of the transistor $Q_{21}$ to the rail 26, which collector is also connected to the terminal $R_2$ and to the cathode of a diode $D_{32}$. The anode of the diode $D_{32}$ is connected by a capacitor C to the rail 26 and also to the anodes of two diodes $D_{33}$, $D_{34}$ and a zener diode $ZD_5$. The cathode of the diode $D_{33}$ is connected to terminal 49 and that of the zener diode $ZD_5$ is connected by two resistors $R_{117}$ and $R_{118}$ in series to the rail 26. The junction of this resistor is connected to the base of a pnp transistor $Q_{22}$ with its emitter connected to the rail 26 and its collector connected by a resistor $R_{119}$ to the rail. The cathode of the diode $D_{34}$ is connected to the collector of an npn transistor $Q_{23}$ with its emitter grounded to rail 27 and its collector connected by a resistor $R_{120}$ to the rail 27. The base of the transistor $Q_{23}$ is connected by resistor $R_{121}$ to the rail 27 and also to the anode of a zener diode $ZD_6$ the cathode of which is connected to the terminal 24 and, by a resistor $R_{122}$ to the rail 26. This transistor $Q_{22}$ can be turned on by a positive going signal at the terminal 24 or at the terminal 50 or a negative going signal at the terminal 49.

The collector of the transistor $Q_{22}$ is connected to the TRIGGER terminal of another timer circuit $T_7$ connected as a monostable multivibrator with a pulse duration of 100 $\mu$S. The THRESHOLD and DISCHARGE terminals of the timer $T_7$ are connected by a capacitor $C_{22}$ to the rail 27 and by a resistor $R_{123}$ to the rail 26. The CONTROL VOLTAGE terminal is connected by a capacitor $C_{23}$ to the rail 27 and the RESET terminal is connected directly to the rail 26.

The OUTPUT terminal of the timer $C_7$ is coupled by a capacitor $C_{24}$ to the TRIGGER terminal of another timer $T_8$. This TRIGGER terminal is connected to the rail 26 by a resistor $R_{124}$ and a diode $D_{35}$ in parallel so that the timer $T_8$ is triggered by the falling edge of the output pulse of the timer $T_7$. The timer $T_8$ is connected as a monostable multivibrator with a pulse duration of 50 μS. Its THRESHOLD and DISCHARGE terminals are connected to the rail 27 by a capacitor $C_{25}$ and to the rail 26 by a resistor $R_{125}$. The CONTROL VOLTAGE terminal of the timer $T_8$ is connected to the rail 27 by a capacitor $C_{26}$. The RESET terminal of the timer $T_8$ is connected to the collector of an npn transistor $Q_{24}$ which has its emitter grounded to rail 27 and its collector connected to the rail 26 by a resistor $R_{126}$. The base of the transistor $Q_{24}$ is connected to the collector of an npn transistor $Q_{25}$, the emitter of which is connected to the rail 27 and the collector of which is connected by a resistor $R_{127}$ to the rail 26. The base of the transistor $Q_{25}$ is connected to the junction of two resistors $R_{128}$, $R_{129}$ connected in series between the OUTPUT terminal of the timer $T_8$ and the rail 27 and also connected by a resistor $R_{130}$ to the cathode of a diode $D_{36}$ with its anode connected to the collector of the transistor $Q_{23}$.

The OUTPUT terminal of the timer $T_8$ is also connected by two resistors Rhd 131 and $R_{132}$ in series to the rail 27, with the junction of these resistors connected to the base of an npn transistor $Q_{26}$. The emitter of the transistor $Q_{26}$ is connected to the rail 27 and its collector is connected via a normally closed override contact 51 to the $R_1$ terminal and also by a resistor $R_{133}$, to the rail 26.

The timer $T_7$ is triggered when the transistor $Q_{22}$ turns off either as a result of the signal at terminal 49 going high (caused by triggering of timer $T_3$) or as a result of the signal at terminal 24 going low. At the end of the output pulse from the timer $T_7$, the timer $T_8$ is triggered, provided to signal at terminal 24 remains low. Once triggered the timer $T_8$ is not reset if the signal at terminal 24 goes high.

Turning finally to FIG. 7, two simple logic circuits are shown. Firstly there is an npn transistor $Q_{27}$ controlling the signal at the terminal 29 in accordance with the signals at the terminals 46 and 49. The emitter of the transistor $Q_{27}$ is connected to the rail 27 and its base is connected to the same rail by a resistor $R_{135}$. This base is also connected to the anode of a zener diode ZD7, the cathode of which is connected by a resistor $R_{136}$ to the cathodes of two diodes $D_{37}$ and $D_{38}$, which have their anodes connected to the terminals 46 and 49 respectively. A capacitor $C_{27}$ is connected between the cathodes of these diodes and the rail 27. The collector of the transistor $Q_{27}$ is connected to the terminal 29 and by a resistor $R_{137}$ to the rail 26. It will be appreciated that the signal at the terminal 29 goes high to cause the field effect transistor $Q_3$ (FIG. 2) to become conductive, only when the signals at terminals 46 and 49 are both low.

The remainder of FIG. 7 controls the signal at terminal 37 in accordance with the signals at terminals 46, 47 and 49. An npn transistor $Q_{28}$ has its emitter connected to the rail 27 and its base connected to the same rail by a resistor $R_{140}$. This base is also connected to the anode of a zener diode ZD8, the cathode of which is connected by a resistor $R_{141}$ to the cathodes of three diodes $D_{39}$, $D_{40}$ and $D_{41}$ with their anodes connected to the terminals 46, 47 and 49 respectively. A capacitor $C_{28}$ is connected between the cathodes of these diodes and the rail 27. The collector of the transistor $Q_{28}$ is connected to the terminal 37 and also, by a resistor $R_{142}$ to the rail 26.

In normal running the sequence of operations is as follows:

The thyristor SCR1 is fired when the output of the current comparator operational amplifier $A_5$ goes low provided that the signal at terminal 39 is high (i.e. There ae currently no pulses being produced by timers $T_3$, $T_5$ and $T_6$) and the signal at terminal 40 is low (i.e. there is an adequate charge for commutation on the capacitor 19).

When the output of the amplifier $A_5$ goes high the timer $T_1$ is held reset (it will not still be producing its output pulse) via transistor $Q_{11}$ turning on when transistor $Q_6$ turns on. Also, transistor $Q_{12}$ turns on, causing transistor $Q_{13}$ to turn on momentarily and triggering the timer $T_2$ provided that the signals at terminals 45, 46 and 47 are all low (i.e. provided none of timers $T_5$, $T_6$ or $T_7$ is producing a pulse). This causes firing of the thyristor SCR2 to commutate the main thyristor SCR1 current.

When the thyristor SCR2 ceases to conduct (indicating completion of commutation) the signal at the terminal 24 goes low, so that, provided the signal at terminal 49 is high (which condition exists for 2.5 mS following firing of the thyristor SCR2 because of timer $T_3$), the timer $T_7$ is triggered. At the end of the timer $T_7$ output pulse timer $T_8$ is fired (assuming that the signal at the terminal 24 has not meanwhile gone high) and the output of the timer $T_8$ turns on the transistor $Q_{26}$ and thereby resets the timer $T_3$. Such resetting of the timer $T_3$ causes triggering of the timer $T_4$ which fires the thyristor SCR3. In the event of the reset pulse at $R_1$ being "missed" for any reason, the timer $T_3$ resets and triggers the timer $T_4$ after its full 2.5 mS delay.

Firing of the thyristor SCR3, causes triggering of the timer $T_5$ which triggers the timer $T_6$ after 300 μS, i.e. sufficient time for the voltage on the capacitor 19 to reverse and settle. During the 100 μS pulse duration of the timer, $T_6$, the f.e.t. $Q_3$ is conductive and the voltage on the capacitor 19 is sampled so that the signal at terminal 30 is adjusted to set the upper and lower current limits for the next cycle. Only when the signal at the terminal 47 goes low at the end of this 100 μS does the signal at the terminal 37 go high again to allow the next cycle to start.

Firing of thyristor SCR1 and SCR2 is prevented if the signal at terminal 31 goes low, but this can be overridden if required, for test purposes.

In the creep mode contact 48 is closed and the thyristors SCR2 and SCR3 are fired alternately whilst the signal at terminal 36 is high (i.e., after the motor current falls below its lower limit) so that some current can flow in the motor when the signal at terminal 36 goes low such alternate firing ceases until the motor current falls again below its lower limit.

I claim:

1. An electric vehicle traction motor control circuit comprising a main thyristor in series with the motor armature between a pair of supply rails, a second thyristor arranged on firing to divert current from the main thyristor into a commutating capacitor, a third thyristor connected in series with an inductor across the commutating capacitor and arranged on firing to reverse the voltage on the commutating capacitor, driver operable control means for determining upper and lower motor current limits, means sensitive to the magnitude of a voltage stored on the commutating capacitor for downwardly adjusting said motor current limits independently of said driver operable control means if said stored voltage is too low to ensure commutation, first firing control means for firing the main thyristor when the actual motor current is less than said lower limit, second firing control means for firing the second thyristor when the actual motor current exceeds the upper limit and third firing control means for the third thyristor.

2. An electric vehicle traction motor control circuit as claimed in claim 1 in which said capacitor voltage sensitive means comprises means coupling said capacitor voltage to an amplifier, the output of which is related to the capacitor voltage, and a sample and hold circuit, whereby the output voltage of said amplifier is sampled periodically in synchronism with the operation of the motor control circuit.

3. An electric vehicle traction motor control circuit as claimed in claim 2 in which said sample and hold circuit has a control terminal connected to the firing control means so as to cause sampling of the amplifier outlet in an interval between firing of the third thyristor and firing of the second thyristor.

4. An electric vehicle traction motor control circuit as claimed in claim 3 in which a delay circuit is provided which is connected to the third thyristor firing means for causing said sample and hold circuit to sample the amplifier output a fixed delay after firing of the third thyristor.

5. An electric vehicle traction motor control circuit as claimed in claim 1 in which said driver operable control means includes a current demand signal generator and said first and second firing control means includes a common comparator having a feedback circuit whereby said upper and lower limits are established, said comparator receiving the demand signal and a signal corresponding to the actual motor current and said commutating capacitor voltage sensing means acting to overringly limit the demand signal to a level determined by the commutating capacitor voltage.

6. An electric vehicle traction motor control circuit as claimed in claim 5 in which said current demand signal generator is connected to the comparator through the intermediary of a circuit including an operational amplifier, a pair of series resistors connecting the output terminal of the operational amplifier to the base of an emitter follower transistor the emitter of which is connected to the comparator, a capacitor connecting the junction of the series resistor to a supply rail and a feedback resistor connecting the emitter of the emitter follower transistor to the inverting input terminal of the operational amplifier, the commutating capacitor voltage sensitive means including a diode connected to the base of said emitter follower transistor whereby said means can reduce the base voltage of the emitter follower transistor, but not increase such base voltage.

* * * * *